(12) United States Patent
Shen et al.

(10) Patent No.: US 10,776,553 B2
(45) Date of Patent: Sep. 15, 2020

(54) TECHNIQUES FOR OPTIMIZING DUAL TRACK ROUTING

(71) Applicant: Cisco Technology, Inc., San Jose, CA (US)

(72) Inventors: Lin Shen, Saratoga, CA (US); Yongming Xiong, Fremont, CA (US); Shahbaz Mahmood, San Jose, CA (US); Maurilio De Nicolo, Saratoga, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/004,958

(22) Filed: Jun. 11, 2018

(65) Prior Publication Data

US 2018/0293345 A1    Oct. 11, 2018

Related U.S. Application Data

(62) Division of application No. 14/507,632, filed on Oct. 6, 2014, now Pat. No. 9,996,653.

(60) Provisional application No. 61/900,991, filed on Nov. 6, 2013.

(51) Int. Cl.
| | | |
|---|---|---|
| *G06F 30/394* | (2020.01) | |
| *H05K 7/20* | (2006.01) | |
| *H01R 13/629* | (2006.01) | |
| *H05K 1/02* | (2006.01) | |
| *H05K 1/11* | (2006.01) | |

(Continued)

(52) U.S. Cl.
CPC ..... *G06F 30/394* (2020.01); *H01R 13/62994* (2013.01); *H05K 1/0296* (2013.01); *H05K 1/115* (2013.01); *H05K 7/20* (2013.01); *H05K 7/20009* (2013.01); *H05K 7/20127* (2013.01); *H05K 7/20545* (2013.01); *H05K 7/20709* (2013.01); *G06F 2111/04* (2020.01); *G06F 2119/10* (2020.01); *H05K 2201/09227* (2013.01); *H05K 2201/09236* (2013.01); *Y10T 29/49156* (2015.01)

(58) Field of Classification Search
CPC ......... Y10T 29/49156; Y10T 29/49155; Y10T 29/49124; Y10T 29/49117; Y10T 29/49002; G06F 17/5077; G06F 17/5081; G06F 17/509; H05K 1/0296; H05K 1/115; H05K 1/0228; H05K 1/0245
USPC .................. 29/846, 832, 829, 825, 592.1
See application file for complete search history.

(56) References Cited

U.S. PATENT DOCUMENTS

| | | |
|---|---|---|
| 4,298,770 A | 11/1981 | Nishihara et al. |
| 4,636,919 A | 1/1987 | Itakura et al. |
| 4,700,016 A | 10/1987 | Hitchcock et al. |

(Continued)

FOREIGN PATENT DOCUMENTS

| | | |
|---|---|---|
| CN | 202042311 U | 11/2011 |
| CN | 202153328 U | 2/2012 |
| WO | WO 2014/071996 | 5/2014 |

*Primary Examiner* — Peter Dungba Vo
*Assistant Examiner* — Azm A Parvez
(74) *Attorney, Agent, or Firm* — Polsinelli PC

(57) ABSTRACT

The subject technology provides a method and apparatus for performing dual track routing. A pair of signal traces is routed in between two rows of contacts and at least one of the signal traces is modified to satisfy a routing restriction. The modification of the signal trace includes three trace segments that deviate the signal trace away from the source of the routing restriction.

18 Claims, 8 Drawing Sheets

(51) Int. Cl.
G06F 111/04 (2020.01)
G06F 119/10 (2020.01)

(56) References Cited

U.S. PATENT DOCUMENTS

| | | | |
|---|---|---|---|
| 4,703,394 A | 10/1987 | Petit et al. | |
| 5,405,267 A | 4/1995 | Koegel et al. | |
| 5,859,835 A | 1/1999 | Varma et al. | |
| 5,926,458 A | 7/1999 | Yin et al. | |
| 6,266,248 B1 | 7/2001 | Hanas et al. | |
| 6,389,031 B1 | 5/2002 | Chao | |
| 6,515,866 B2 | 2/2003 | Ulrich | |
| 6,634,898 B2 | 10/2003 | Clements | |
| 6,677,831 B1 | 1/2004 | Cheng et al. | |
| 6,714,553 B1 | 3/2004 | Poole et al. | |
| 6,752,662 B2 | 6/2004 | Okamoto | |
| 6,757,897 B1 | 6/2004 | Shi et al. | |
| 6,866,544 B1 | 3/2005 | Casey et al. | |
| 6,876,952 B1 | 4/2005 | Kappler et al. | |
| 6,879,486 B1 | 4/2005 | Banton et al. | |
| 6,898,088 B2 | 5/2005 | Megason et al. | |
| 6,907,039 B2 | 6/2005 | Shen | |
| 6,941,649 B2 | 9/2005 | Goergen | |
| 6,952,421 B1 | 10/2005 | Slater | |
| 6,954,463 B1 | 10/2005 | Ma et al. | |
| 6,961,249 B2 | 11/2005 | Wong | |
| 6,996,099 B1 | 2/2006 | Kadambi et al. | |
| 7,152,117 B1 | 12/2006 | Stapp et al. | |
| 7,177,946 B1 | 2/2007 | Kaluve et al. | |
| 7,180,011 B1 * | 2/2007 | Hall | H01L 23/49822 174/255 |
| 7,301,778 B1 | 11/2007 | Fang | |
| 7,369,400 B2 | 5/2008 | Bang et al. | |
| 7,372,857 B1 | 5/2008 | Kappler et al. | |
| 7,411,915 B1 | 8/2008 | Spain et al. | |
| 7,426,604 B1 | 9/2008 | Rygh et al. | |
| 7,452,216 B2 | 11/2008 | Murr et al. | |
| 7,502,229 B2 | 3/2009 | Bordiga | |
| 7,630,368 B2 | 12/2009 | Tripathi et al. | |
| 7,665,998 B2 | 2/2010 | Kressner et al. | |
| 7,684,209 B2 | 3/2010 | Roesner | |
| 7,729,296 B1 | 6/2010 | Choudhary | |
| 7,826,469 B1 | 11/2010 | Li et al. | |
| 7,830,223 B2 | 11/2010 | Ahmad | |
| 8,302,301 B2 | 11/2012 | Lau | |
| 8,325,459 B2 * | 12/2012 | Mutnury | H05K 1/0245 361/260 |
| 8,339,973 B1 | 12/2012 | Pichumani et al. | |
| 8,378,223 B1 | 2/2013 | Shiue et al. | |
| 8,449,203 B2 | 5/2013 | Downs | |
| 8,534,930 B1 | 9/2013 | Lima | |
| 8,586,414 B2 | 11/2013 | Xue et al. | |
| 8,687,629 B1 | 4/2014 | Kompella et al. | |
| 8,868,766 B1 | 10/2014 | Theimer et al. | |
| 8,953,332 B2 | 2/2015 | Canfield et al. | |
| 9,099,846 B2 | 8/2015 | McKay et al. | |
| 9,203,188 B1 | 12/2015 | Siechen et al. | |
| 9,246,280 B2 | 1/2016 | Neer et al. | |
| 9,258,195 B1 | 2/2016 | Pendleton et al. | |
| 9,374,294 B1 | 6/2016 | Pani | |
| 9,402,470 B2 | 8/2016 | Shen et al. | |
| 9,407,501 B2 | 8/2016 | Yadav et al. | |
| 9,433,081 B1 | 8/2016 | Xiong et al. | |
| 9,444,634 B2 | 9/2016 | Pani | |
| 9,502,111 B2 | 11/2016 | Dharmapurikar et al. | |
| 9,509,092 B2 | 11/2016 | Shen et al. | |
| 9,544,224 B2 | 1/2017 | Chu et al. | |
| 9,590,914 B2 | 3/2017 | Attar et al. | |
| 9,627,063 B2 | 4/2017 | Dharmapurikar et al. | |
| 9,634,846 B2 | 4/2017 | Pani | |
| 9,635,937 B2 | 5/2017 | Shen et al. | |
| 9,654,300 B2 | 5/2017 | Pani | |
| 9,654,385 B2 | 5/2017 | Chu et al. | |
| 9,654,409 B2 | 5/2017 | Yadav et al. | |
| 9,655,232 B2 | 5/2017 | Saxena et al. | |
| 9,667,431 B2 | 5/2017 | Pani | |
| 9,667,551 B2 | 5/2017 | Edsall et al. | |
| 9,674,086 B2 | 6/2017 | Ma et al. | |
| 9,686,180 B2 | 6/2017 | Chu et al. | |
| 9,698,994 B2 | 7/2017 | Pani | |
| 9,716,665 B2 | 7/2017 | Attar et al. | |
| 9,742,673 B2 | 8/2017 | Banerjee et al. | |
| 9,755,965 B1 | 9/2017 | Yadav et al. | |
| 9,806,995 B2 | 10/2017 | Chu et al. | |
| 9,825,857 B2 | 11/2017 | Banerjee et al. | |
| 9,832,122 B2 | 11/2017 | Dharmapurikar et al. | |
| 9,876,711 B2 | 1/2018 | Chu et al. | |
| 9,985,794 B2 | 5/2018 | Pani | |
| 9,996,653 B1 | 6/2018 | Shen et al. | |
| 10,020,989 B2 | 7/2018 | Yadav et al. | |
| 2002/0126671 A1 | 9/2002 | Ellis et al. | |
| 2002/0146026 A1 | 10/2002 | Unitt et al. | |
| 2002/0189849 A1 * | 12/2002 | Hirose | H05K 1/0256 174/250 |
| 2003/0035385 A1 | 2/2003 | Walsh et al. | |
| 2003/0067924 A1 | 4/2003 | Choe et al. | |
| 2003/0097461 A1 | 5/2003 | Barham et al. | |
| 2003/0115319 A1 | 6/2003 | Dawson et al. | |
| 2003/0137940 A1 | 7/2003 | Schwartz et al. | |
| 2003/0174650 A1 | 9/2003 | Shankar et al. | |
| 2003/0231646 A1 | 12/2003 | Chandra et al. | |
| 2004/0062259 A1 | 4/2004 | Jeffries et al. | |
| 2004/0073715 A1 | 4/2004 | Folkes et al. | |
| 2004/0100901 A1 | 5/2004 | Bellows | |
| 2004/0103310 A1 | 5/2004 | Sobel et al. | |
| 2004/0160956 A1 | 8/2004 | Hardy et al. | |
| 2004/0249960 A1 | 12/2004 | Hardy et al. | |
| 2005/0007961 A1 | 1/2005 | Scott et al. | |
| 2005/0013280 A1 | 1/2005 | Buddhikot et al. | |
| 2005/0157987 A1 | 7/2005 | Dodds et al. | |
| 2005/0175020 A1 | 8/2005 | Park et al. | |
| 2005/0207410 A1 | 9/2005 | Adhikari et al. | |
| 2006/0028285 A1 | 2/2006 | Jang et al. | |
| 2006/0031643 A1 | 2/2006 | Figueira | |
| 2006/0198315 A1 | 9/2006 | Sasagawa et al. | |
| 2006/0209688 A1 | 9/2006 | Tsuge et al. | |
| 2006/0221835 A1 | 10/2006 | Sweeney | |
| 2006/0250982 A1 | 11/2006 | Yuan et al. | |
| 2006/0268742 A1 | 11/2006 | Chu et al. | |
| 2006/0280179 A1 | 12/2006 | Meier | |
| 2007/0025241 A1 | 2/2007 | Nadeau et al. | |
| 2007/0223372 A1 | 9/2007 | Haalen et al. | |
| 2007/0274229 A1 | 11/2007 | Scholl et al. | |
| 2007/0280264 A1 | 12/2007 | Milton et al. | |
| 2008/0031130 A1 | 2/2008 | Raj et al. | |
| 2008/0031247 A1 | 2/2008 | Tahara et al. | |
| 2008/0092213 A1 | 4/2008 | Wei et al. | |
| 2008/0147830 A1 | 6/2008 | Ridgill et al. | |
| 2008/0151863 A1 | 6/2008 | Lawrence et al. | |
| 2008/0177896 A1 | 7/2008 | Quinn et al. | |
| 2008/0225853 A1 | 9/2008 | Melman et al. | |
| 2008/0310421 A1 | 12/2008 | Teisberg et al. | |
| 2009/0094357 A1 | 4/2009 | Keohane et al. | |
| 2009/0122805 A1 | 5/2009 | Epps et al. | |
| 2009/0188711 A1 * | 7/2009 | Ahmad | H05K 1/0248 174/262 |
| 2009/0193103 A1 | 7/2009 | Small et al. | |
| 2009/0232011 A1 | 9/2009 | Li et al. | |
| 2009/0268614 A1 | 10/2009 | Tay et al. | |
| 2010/0128619 A1 | 5/2010 | Shigei | |
| 2010/0150155 A1 | 6/2010 | Napierala | |
| 2010/0191813 A1 | 7/2010 | Gandhewar et al. | |
| 2010/0191839 A1 | 7/2010 | Gandhewar et al. | |
| 2010/0223655 A1 | 9/2010 | Zheng | |
| 2010/0287227 A1 | 11/2010 | Goel et al. | |
| 2010/0299553 A1 | 11/2010 | Cen | |
| 2010/0312875 A1 | 12/2010 | Wilerson et al. | |
| 2011/0110241 A1 | 5/2011 | Atkinson et al. | |
| 2011/0138310 A1 | 6/2011 | Gomez et al. | |
| 2011/0158248 A1 | 6/2011 | Voruganti et al. | |
| 2011/0170426 A1 | 7/2011 | Kompella et al. | |
| 2011/0203834 A1 * | 8/2011 | Yoneya | H05K 1/025 174/250 |
| 2011/0228795 A1 | 9/2011 | Agrawal et al. | |

(56) References Cited

U.S. PATENT DOCUMENTS

| | | |
|---|---|---|
| 2011/0249682 A1 | 10/2011 | Kean et al. |
| 2011/0286447 A1 | 11/2011 | Liu |
| 2011/0299406 A1 | 12/2011 | Vobbilisetty et al. |
| 2011/0310738 A1 | 12/2011 | Lee et al. |
| 2011/0320667 A1 | 12/2011 | Chiu et al. |
| 2011/0321031 A1 | 12/2011 | Dournov et al. |
| 2012/0007688 A1 | 1/2012 | Zhou et al. |
| 2012/0063318 A1 | 3/2012 | Boddu et al. |
| 2012/0102114 A1 | 4/2012 | Dunn et al. |
| 2012/0163396 A1 | 6/2012 | Cheng et al. |
| 2012/0275304 A1 | 11/2012 | Patel et al. |
| 2012/0281697 A1 | 11/2012 | Huang |
| 2012/0300787 A1 | 11/2012 | Korger |
| 2013/0055155 A1 | 2/2013 | Wong et al. |
| 2013/0090014 A1 | 4/2013 | Champion |
| 2013/0097335 A1 | 4/2013 | Jiang et al. |
| 2013/0124708 A1 | 5/2013 | Lee et al. |
| 2013/0182712 A1 | 7/2013 | Aguayo et al. |
| 2013/0250951 A1 | 9/2013 | Koganti |
| 2013/0311663 A1 | 11/2013 | Kamath et al. |
| 2013/0311991 A1 | 11/2013 | Li et al. |
| 2013/0322258 A1 | 12/2013 | Nedeltchev et al. |
| 2013/0322446 A1 | 12/2013 | Biswas et al. |
| 2013/0322453 A1 | 12/2013 | Allan |
| 2013/0332399 A1 | 12/2013 | Reddy et al. |
| 2013/0332577 A1 | 12/2013 | Nakil et al. |
| 2013/0332602 A1 | 12/2013 | Nakil et al. |
| 2014/0016501 A1 | 1/2014 | Kamath et al. |
| 2014/0047264 A1 | 2/2014 | Wang et al. |
| 2014/0056298 A1 | 2/2014 | Vobbilisetty et al. |
| 2014/0068750 A1 | 3/2014 | Tjahjono et al. |
| 2014/0086253 A1 | 3/2014 | Yong et al. |
| 2014/0105039 A1 | 4/2014 | Mcdysan |
| 2014/0105062 A1 | 4/2014 | Mcdysan et al. |
| 2014/0105216 A1 | 4/2014 | Mcdysan |
| 2014/0146817 A1 | 5/2014 | Zhang |
| 2014/0146824 A1 | 5/2014 | Angst et al. |
| 2014/0201375 A1 | 7/2014 | Beereddy et al. |
| 2014/0219275 A1 | 8/2014 | Allan et al. |
| 2014/0241353 A1 | 8/2014 | Zhang et al. |
| 2014/0244779 A1 | 8/2014 | Roitshtein et al. |
| 2014/0269712 A1 | 9/2014 | Kidambi |
| 2014/0307744 A1 | 10/2014 | Dunbar et al. |
| 2014/0321277 A1 | 10/2014 | Lynn, Jr. et al. |
| 2014/0334295 A1 | 11/2014 | Guichard et al. |
| 2014/0341029 A1 | 11/2014 | Allan et al. |
| 2014/0372582 A1 | 12/2014 | Ghanwani et al. |
| 2015/0009992 A1 | 1/2015 | Zhang |
| 2015/0092551 A1 | 4/2015 | Moisand et al. |
| 2015/0092593 A1 | 4/2015 | Kompella |
| 2015/0113143 A1 | 4/2015 | Stuart et al. |
| 2015/0124644 A1 | 5/2015 | Pani |
| 2015/0124806 A1 | 5/2015 | Banerjee et al. |
| 2015/0124823 A1 | 5/2015 | Pani et al. |
| 2015/0124824 A1 | 5/2015 | Edsall et al. |
| 2015/0124833 A1 | 5/2015 | Ma et al. |
| 2015/0236900 A1 | 8/2015 | Chung |
| 2015/0378712 A1 | 12/2015 | Cameron et al. |
| 2015/0378969 A1 | 12/2015 | Powell et al. |
| 2016/0119204 A1 | 4/2016 | Murasato et al. |
| 2017/0085469 A1 | 3/2017 | Chu et al. |
| 2017/0207961 A1 | 7/2017 | Saxena et al. |
| 2017/0214619 A1 | 7/2017 | Chu et al. |
| 2017/0237651 A1 | 8/2017 | Pani |
| 2017/0237678 A1 | 8/2017 | Ma et al. |
| 2017/0250912 A1 | 8/2017 | Chu et al. |

\* cited by examiner

TECHNIQUES FOR OPTIMIZING DUAL TRACK ROUTING

CLAIM TO PRIORITY

This application is a divisional of U.S. application Ser. No. 14/507,632 filed on Oct. 6, 2014, which claims the benefit of U.S. provisional application No. 61/900,991, filed on Nov. 6, 2013, which is expressly incorporated by reference herein in its entirety.

TECHNICAL FIELD

The present technology relates in general to the field of printed circuit board layout, and in particular, to techniques for routing signals to and from an array of contacts.

BACKGROUND

Electronic systems used for computing and networking applications continue to evolve and increase in complexity. Routing the signals on a densely populated printed circuit board (PCB) or an integrated circuit (IC) used in these systems becomes extremely challenging due to restrictions associated with design and manufacturing constraints. For example, the evolution of ball-grid array (BGA) packaging to smaller pitch sizes presents unique challenges when fanning out signals. Design optimization is often balanced with the increased costs that accompany advanced manufacturing techniques.

BRIEF DESCRIPTION OF THE DRAWINGS

In order to describe the manner in which the above-recited and other advantages and features of the disclosure can be obtained, a more particular description of the principles briefly described above will be rendered by reference to specific examples thereof which are illustrated in the appended drawings. Understanding that these drawings depict only examples of the disclosure and are not therefore to be considered to be limiting of its scope, the principles herein are described and explained with additional specificity and detail through the use of the accompanying drawings in which.

DESCRIPTION OF EXAMPLE EMBODIMENTS

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

The present disclosure describes a technique for routing signal traces on printed circuit boards. In particular, the present disclosure relates to techniques for routing the traces to minimize the impact of routing restrictions and to minimize the effects of cross-talk. The present technology provides a routing approach that can be utilized with basic PCB manufacturing technology and thus decreases the associated manufacturing costs.

Overview:

The subject technology provides embodiments for a method of routing signal traces on a printed circuit board. The method includes routing a first signal trace and a second signal trace on substantially parallel conductive paths and determining that the first signal trace violates a routing restriction. The first signal trace that violates the routing restriction is modified by replacing one or more sections of the signal trace with at least one serpentine structure. The serpentine structure includes three trace segments: a first trace segment directed towards the second signal trace, a second trace segment connected to the first trace segment that is parallel to second signal trace, and a third trace segment connected to the second trace segment, the third trace segment directed away from the second signal trace. Alternatively, the first signal trace can be modified by replacing one or more sections of the signal trace with a curved or an arced trace structure.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

Figure 1:
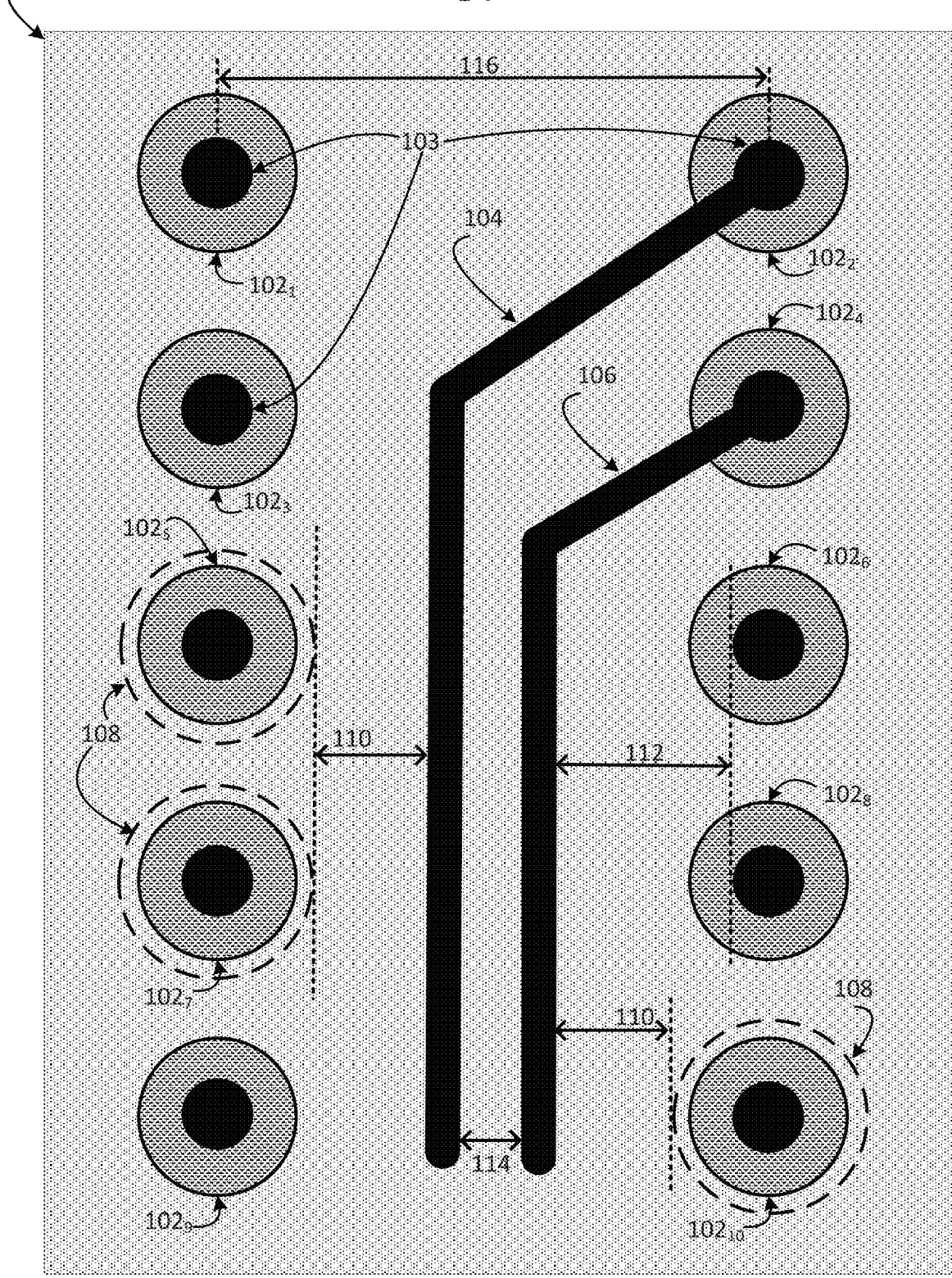
FIG. 1 illustrates an example system using dual track routing.

FIG. 1 illustrates an example of a system using dual track routing. Dual track routing is an effective technique that can be used to route traces to and from ball-grid array (BGA) packages. The term "dual-track" refers to a pair of traces that are routed along a single channel that resides between two rows or columns of electrical contacts. In some examples, the electrical contacts can correspond to balls on a BGA package. Furthermore, the electrical contacts can contain one or more "vias" on the PCB. As referred to herein, a "via" is an electrical connection that traverses two or more adjacent layers in a physical electronic circuit such as a PCB. A via may be located independent of an electrical contact or it may be placed within the area that corresponds to the electrical contact. The techniques related to dual-track routing can be used on both outer and inner layers of a PCB.

In FIG. 1, the system consists of a printed circuit board (PCB) 100 having contacts $102_1, 102_2 \ldots 102_n$ (collectively 102) configured to receive an electrical component having a BGA package. Each contact $102_i$ can include a via 103 for transferring the signal to one or more layers of PCB 100. The BGA package can be associated with a BGA pitch 116 which defines the distance from the center of one contact to the center of an adjacent contact. There are different JEDEC standards that define BGA pitch 116. The BGA pitch 116 depends largely on the size limitations of the application; small pitch sizes can start as low as 0.3 mm. A common size for BGA pitch 116 is 1 mm, equivalent to 39.37 mils.

The PCB 100 can have a first signal trace 104 routed to/from contact $102_2$ and a second signal trace 106 routed to/from contact $102_4$. The first signal trace 104 and the second signal trace 106 can be routed using a dual track routing technique wherein the two traces are located between two columns of contacts 102. In some examples, the pair of traces can be a differential signal pair that necessitates routing conductive paths that are substantially parallel.

There are a number of restrictions associated with dual track routing. To begin with, each signal trace has a width associated with it. The width of a signal trace can affect signal integrity and parameters such as trace impedance. In the case where two signal traces correspond to a differential signal pair, the trace width of the traces and the spacing between the traces will determine the differential pair impedance. The target impedance for the differential pair and the PCB stack-up will dictate the corresponding trace widths and the spacing required.

Changing the width of a trace can also affect the spacing required between traces. For example, trace spacing 114 can be reduced if the corresponding widths of signal trace 104 and signal trace 106 are also reduced. In one embodiment, the width of signal trace 104 and signal trace 106 can be set to 4 mils. Consequently, the trace spacing 114 can also be set to 4 mils. However, if the trace width is reduced to 3.5 mils, then the trace spacing 114 can also be reduced to 3.5 mils. In the case of differential signal pairs, the widths of the two signal traces and the spacing between the two signal traces should remain constant in order to maintain the target differential pair impedance. In some embodiments, the target impedance of the electrical interface can be associated with an allowed tolerance. For example, the target impedance may have a tolerance of +/−10%. Accordingly, the trace width variation and the trace spacing 114 will be limited by the allowed tolerance of the target impedance. Furthermore, the maximum allowed trace width and trace spacing 114 will be also limited by BGA pitch 116.

Additional routing restrictions include a minimum back-drill to metal (BD2M) 110 distance and a drill to metal (D2M) 112 distance. The D2M 112 parameter is defined as the minimum distance from a trace to the perimeter of a via 103. During the manufacturing process, a drill is used to create each via 103. Hence, D2M 112 refers to the distance from the perimeter of the via (drill location) to a trace. The diameter of via 103 is equivalent to the drill bit that is used to create it.

The BD2M 110 parameter is the minimum distance from a trace to the perimeter of the back-drill bit size 108 designated by the dashed circle around via 103 and outside of contacts $102_5$, $102_7$ and $102_{10}$. Back-drilling is a PCB manufacturing technique that is used to remove a via stub. For example, a PCB having 8 layers can have plated through-hole vias that extend across all 8 layers. However, the signal may only need to travel from layer 1 to layer 3. Thus, a via stub would exist that extends from layer 4 to layer 8. This via stub can cause signal integrity problems for high frequency signals. To remedy this problem, a PCB manufacturer can remove the stub by "back-drilling" the via to remove the portion that extends beyond the required layer; in this example the via stub would be drilled (removed) right up to layer 3. This leaves a via that extends only between the desired layers with a very minimal stub length. The drill used to perform this task has a diameter larger than that of the via being drilled. Accordingly, the BD2M parameter takes this into account and prevents a trace from being routed within the area 108 corresponding to the back-drill.

In FIG. 1, vias 103 that are located within contacts $102_5$, $102_7$ and $102_{10}$ have all been back-drilled and traces 104 and 106 must adhere to the BD2M 110 distance requirement. Accordingly, the BD2M 110 and D2M 112 requirements provide routing restrictions that can make dual track routing challenging. A small BGA pitch size 116 can leave little area for the traces to be routed without violating the manufacturing requirements. In some instances, PCB manufacturers can minimize these routing constraints by utilizing advanced manufacturing techniques with tighter tolerances for back-drilling and etching of traces. However, the costs associated with these advanced manufacturing techniques can be quite high making them cost-prohibitive for certain applications. Consequently, routing of the first signal trace 104 and the second signal trace 106 using dual-track routing as depicted in FIG. 1 will likely violate the routing restrictions associated with standard PCB manufacturing techniques. In addition, the proximity of trace 104 and trace 106 to contacts or vias that correspond to other high-speed signals in the design can lead to signal degradation due to cross-talk between signals.

Figure 2:
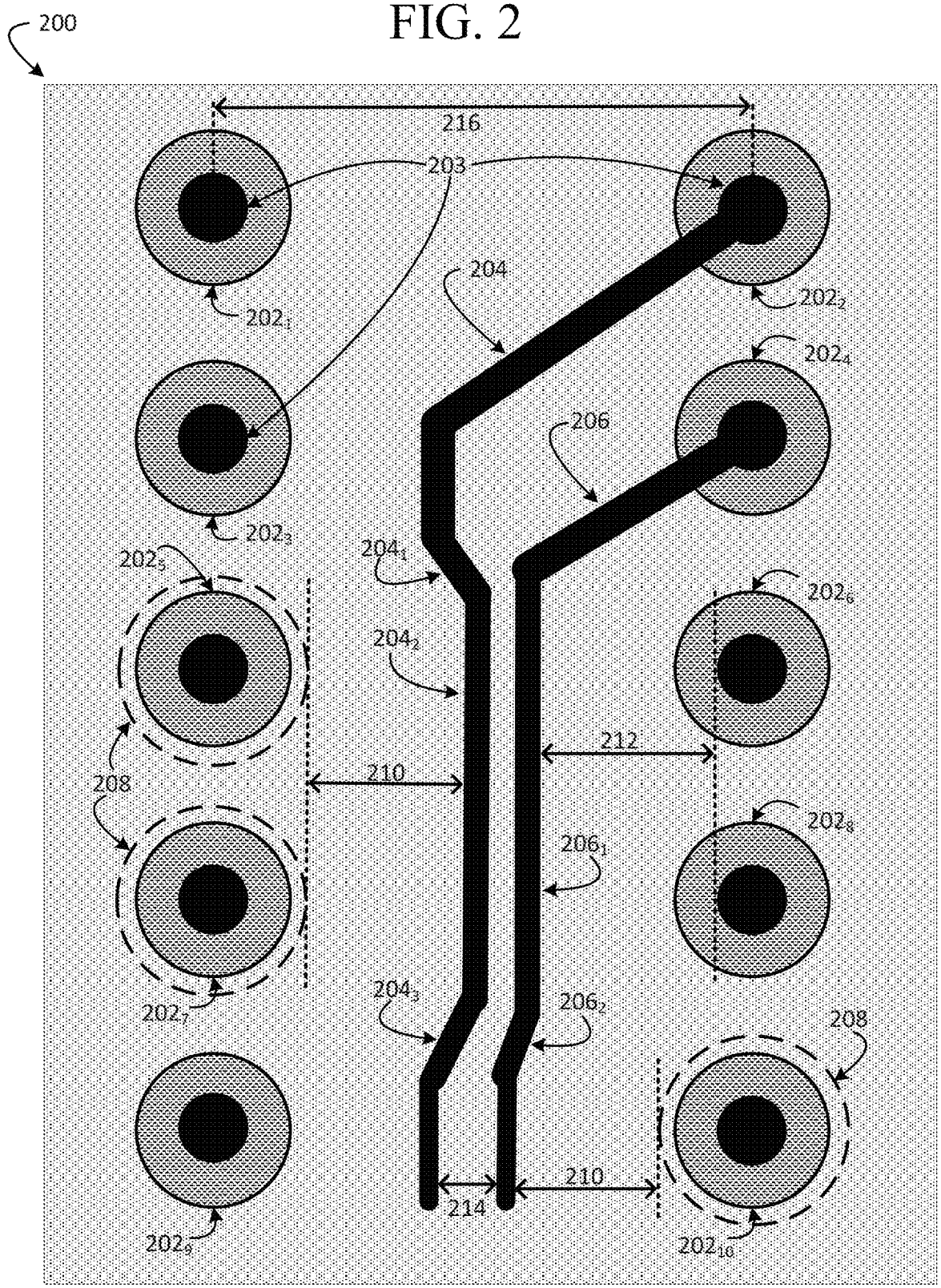
FIG. 2 illustrates an example system using dual track routing according to some aspects of the subject technology.

FIG. 2 illustrates an example system using dual track routing according to some aspects of the subject technology. The system consists of a PCB 200 having contacts $202_1$, $202_2 \ldots 202_n$ (collectively 202) configured to receive an electrical component having a BGA package. The BGA package can be associated with a BGA pitch 216 which defines the distance from the center of one contact to the center of an adjacent contact.

The PCB 200 can have a first signal trace 204 routed to/from contact $202_2$ and a second signal trace 206 routed to/from contact $202_4$. The first signal trace 204 and the second signal trace 206 can be routed using a dual track routing technique wherein the two traces are located between two columns of contacts 202.

Similar to FIG. 1, three of the vias 203 located within contacts $202_5$, $202_7$, and $202_{10}$ have been back-drilled. Therefore the traces 204 and 206 must be routed in accordance with the BD2M 210 minimum distance requirement with respect to $202_5$, $202_7$, and $202_{10}$. Similarly, the D2M 212 requirement sets forth the minimum distance that must be maintained with respect to the remaining contacts 202 that have not been back-drilled.

In order to satisfy the BD2M 210 and D2M 212 routing requirements, trace 204 and trace 206 have been modified. In particular, trace 204 includes a first segment $204_1$ that redirects trace 204 away from contact $202_5$ and toward trace 206. In doing so, trace 204 can be routed such that the required distance BD2M 210 is maintained from the back-drill perimeter 208. The length of segment $204_1$ is selected to allow for sufficient clearance of the BD2M 210 requirement while also maintaining necessary trace spacing 214.

Segment $204_1$ is followed by segment $204_2$ which returns trace 204 to the original orientation that is substantially parallel to trace 206.

As traces 204 and 206 continue to travel down PCB 200, another deviation in path is required because of the BD2M 210 requirement presented by the back-drilled via 203 on contact $202_{10}$. Accordingly, trace 204 has a trace segment $204_3$ that turns it away from trace 206 and trace 206 has a trace segment $206_2$ that takes its path toward trace 204. Consequently, the routing of the traces satisfies the required BD2M 210 distance from the back-drill perimeter 208 that corresponds to the via within contact $202_{10}$.

The back-drilled vias in PCB 200 illustrate the types of restrictions faced with dual-track routing. One that is skilled in the art will recognize that the number of back-drilled vias and their locations can vary among designs. Similarly, the position of the trace segments used to alter the course of a trace and the number of segments required can vary according to the particular design.

In some embodiments, the trace segments that are used to alter the path of a particular trace can be used to create additional space by reducing the width of the segments. For example, the default width of trace 204 can be set to 4 mils. However, trace segment $204_1$, $204_2$, and $204_3$ can have a reduced width that is 3.5 mils, for example. Changing the width of the segments allows for smaller trace separation 214 between trace 204 and trace 206. This technique can be used to obtain additional space when the constraints presented by BD2M 210 and D2M 212 are difficult to achieve.

Figure 3:
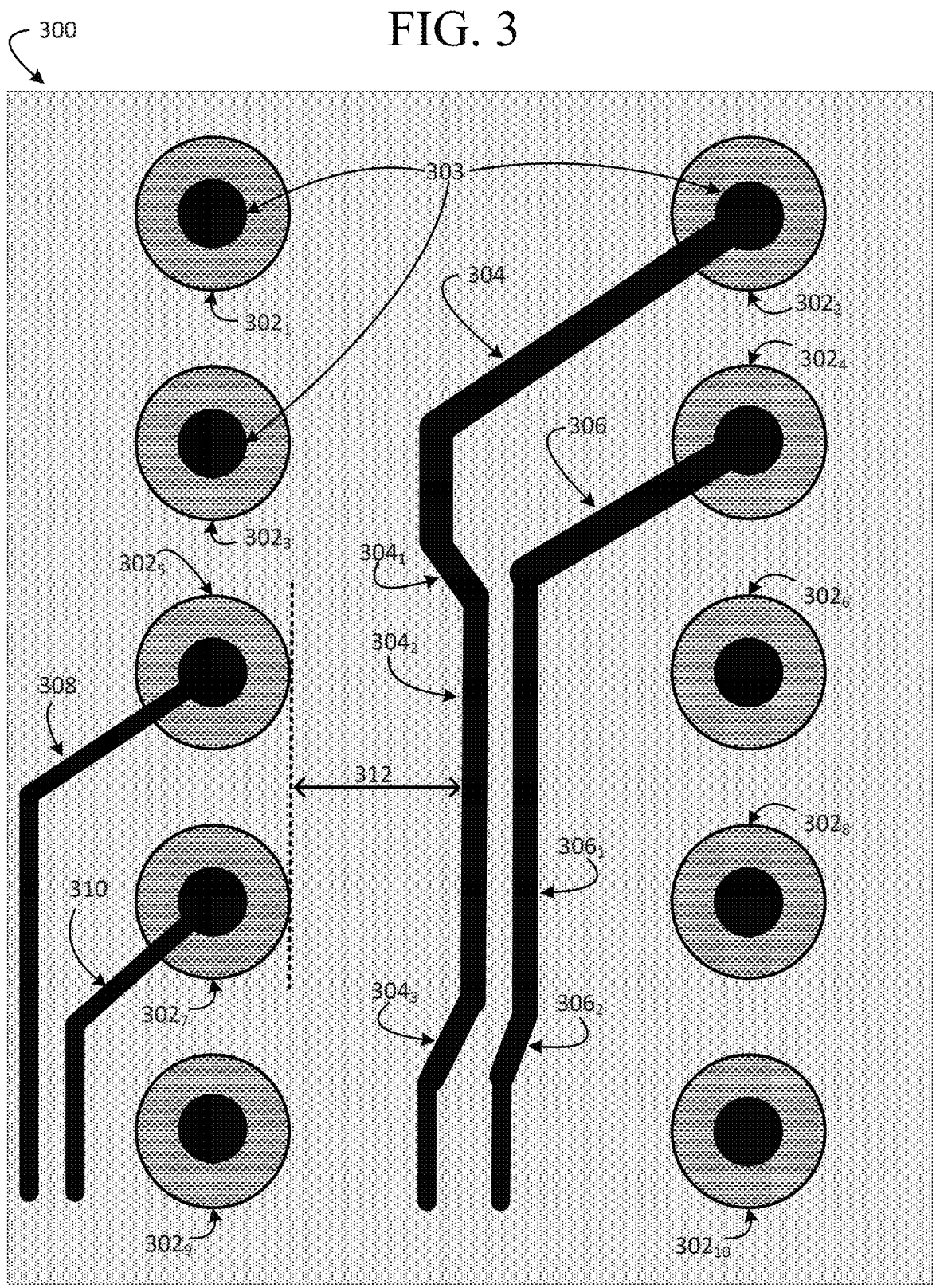
FIG. 3 illustrates an example system using dual track routing to minimize cross-talk among high-speed signals.

FIG. 3 illustrates another example system using dual track routing according to some aspects of the subject technology to minimize cross-talk among high speed signals. The system consists of a PCB 300 having contacts $302_1$, $302_2$ . . . $302_n$ (collectively 302) configured to receive an electrical component having a BGA package.

The PCB 300 can have a first signal trace 304 routed to/from contact $302_2$ and a second signal trace 306 routed to/from contact $302_4$. The first signal trace 304 and the second signal trace 306 can be routed using a dual track routing technique wherein the two traces are located between two columns of contacts 302. In some embodiments, signal trace 304 and signal trace 306 can correspond to a first high-speed differential signal pair. The PCB 300 can also have a third signal trace 308 routed to/from contact $302_5$ and a fourth signal trace 310 routed to/from contact $302_7$. In some embodiments, signal trace 308 and signal trace 310 can correspond to a second high-speed differential signal pair.

In order to satisfy the D2M 312 routing requirement, trace 304 and trace 306 have been modified. In particular, trace 304 includes a first segment $304_1$ that redirects trace 304 away from contact $302_5$ and toward trace 306. In doing so, trace 304 can be routed such that the required distance D2M 312 is maintained. The length of segment $304_1$ is selected to allow for sufficient clearance of the D2M 312 requirement while also maintaining the necessary trace spacing. Segment $304_1$ is followed by segment $304_2$ which returns trace 304 to the original orientation that is substantially parallel to trace 306.

In addition to satisfying the D2M 312 requirement that allows for lower cost PCB 300 manufacturing, the serpentine like deviation of trace 304 also improves the electrical performance of the design. Each of the four traces 304, 306, 308 and 310 on PCB 300 correspond to high-speed digital signals. As those that are skilled in the art will recognize, the proximity of high-speed digital signals can lead to degraded performance caused by electrical cross-talk. Therefore, the deviation of trace 304 away from trace 308 and trace 310 will also improve the signal integrity of each of the signals routed on the four traces because the added distance will reduce the cross-talk in the system. Consequently, in some embodiments, a designer may exceed the D2M 312 minimum requirement in order to maximize cross-talk reduction.

Figure 4:
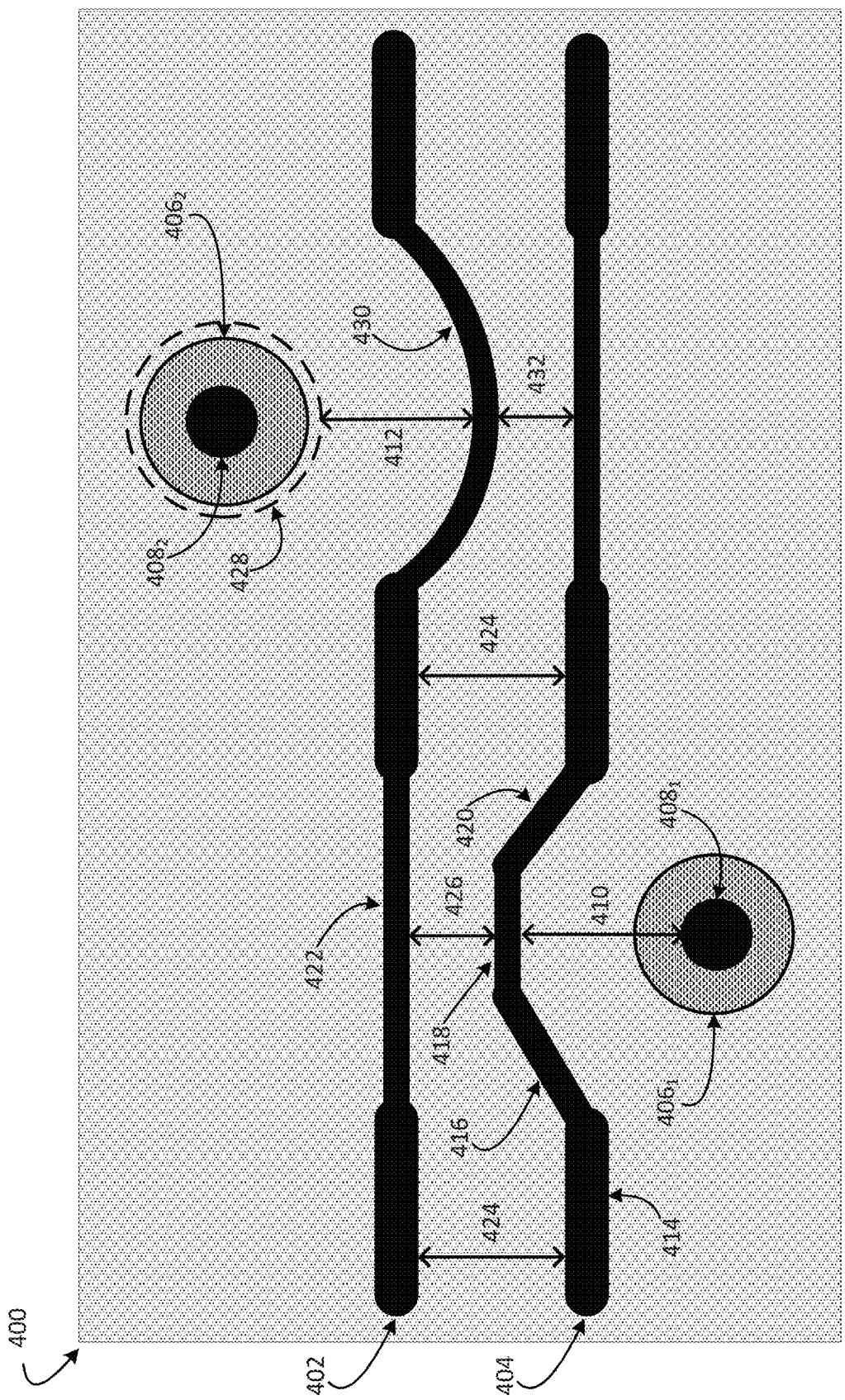
FIG. 4 illustrates another example system using aspects of the disclosed routing techniques.

FIG. 4 illustrates another example system using aspects of the disclosed routing techniques. The system includes a PCB 400 with a first trace 402 and a second trace 404 routed on substantially parallel paths. Trace 402 and trace 404 are routed between contact $406_1$ and contact $406_2$. Contact $406_1$ includes via $408_1$ and contact $406_2$ includes via $408_2$. Via $408_1$ is a through hole via that has not been back-drilled. These types of vias are commonly used for power and/or ground signals that are not susceptible to signal degradation due to a via stub. Via $408_2$ is a via for a signal and has been back-drilled. The back-drill size 428 is shown by the dashed line around contact $406_2$. The back-drill size 428 can vary across different PCB vendors. Similarly, the size of contact $406_2$ can vary according to the size of the balls on its corresponding BGA. Accordingly, back-drill size 428 is shown outside contact $406_2$ as an example, but could also be smaller and therefore inside of contact $406_2$.

The presence of via $408_1$ introduces a design constraint associated with a minimum drill to metal (D2M) 410 distance. Similarly, the presence of back-drilled via $408_2$ introduces a design constraint associated with a minimum back-drill to metal (BD2M) 412 distance. Accordingly, trace 402 and trace 404 are altered to satisfy the D2M 410 and BD2M 412 requirements.

Trace 404 includes a first segment 416 that deviates trace 404 away from the via and toward trace 406. The length of the first segment 416 is selected to allow for suitable clearance of D2M 410 requirement. First segment 416 deviates trace 404 at an angle that is approximately 45 degrees. However, those that are skilled in the art will recognize that different angles can be used to accomplish a similar result.

The first segment 416 is followed by a second segment 418 that is positioned in the original direction of trace 404 and is parallel to trace 402. The length of second segment 418 is selected to keep the minimum D2M 410 distance for as long as necessary. For example, if there were another via adjacent to $408_1$, then second segment 418 can be extended further until the trace routing is beyond that via.

The second segment 418 is followed by a third segment 420 that is angled away from trace 402. In some embodiments, the first segment 416 and the third segment 420 can be substantially equal in length, thus returning trace 404 to its original plane. Alternatively, the first segment 416 and the third segment 420 can different lengths which would take trace 404 along a different path. The first segment 416, second segment 418, and third segment 420 together form a trapezoidal shape with the base of the trapezoid corresponding to the section of trace 404 that was replace by the three segments.

In some embodiments, the first segment 416, second segment 418, and third segment 420 can have a different width than the original trace 404. For example, the width of the three segments can be made smaller to allow for additional space to satisfy the D2M 410 requirement. The reduced widths of the three segments can be equivalent or it can vary from one segment to another. In FIG. 4, second segment 418 has a slightly smaller width than the first segment 416 and the third segment 420, which are equivalent. Furthermore, segment 422 of trace 402 can also be reduced to a width that corresponds to the reduced widths of the segments of trace 404. Reducing the widths of trace 402 and trace 404 can allow for trace separation 426 that is smaller than the original trace separation 424.

The serpentine routing technique of first segment 416, second segment 418 and third segment 420 that is used on trace 404 to satisfy D2M 410 requirement can also be used on trace 402 to satisfy the BD2M 412 requirement. The lengths of the three segments used to deviate trace 402 can be selected to satisfy the BD2M requirement and can therefore be different than the lengths of the segments used in trace 404. However, signal trace 402 illustrates an alternative embodiment where the trace deviation corresponds to a curve 430. Curve 430 can be used to create the required spacing to satisfy the BD2M 412 requirement. The slope of curve 430 can be varied to optimize the spacing between a routing restriction such as BD2M 412 and the trace spacing 432. The alternative embodiment illustrated by curve 430 can be used to avoid the turns or corners associated with a serpentine arrangement. Those that are skilled in the art will recognize that the two techniques can be combined such that a curved structure is introduced to the ends of trace segments 416, 418, and 420.

Figure 5:
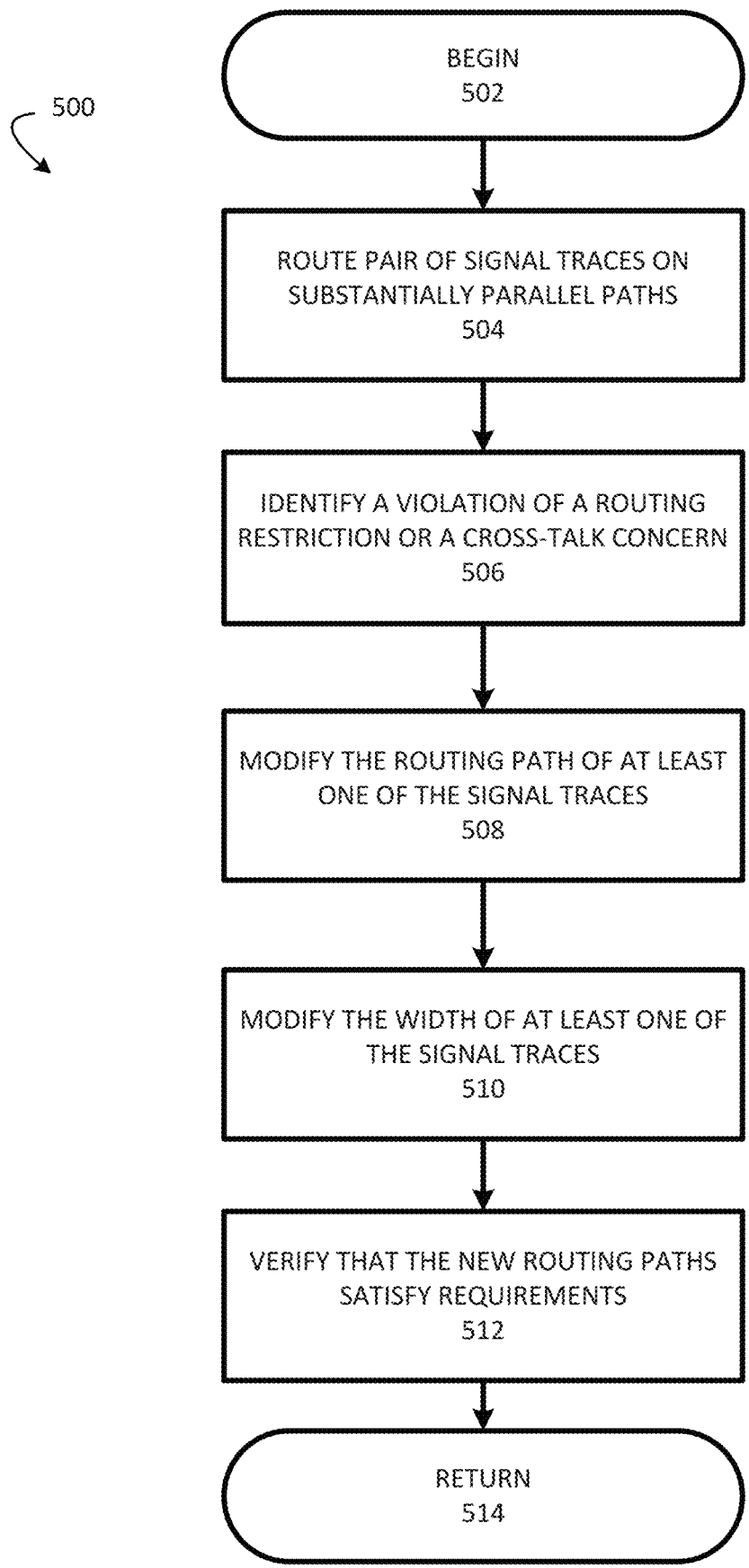
FIG. 5 illustrates an example method for implementing the disclosed routing techniques.

FIG. 5 illustrates an example method for implementing the disclosed routing techniques. The method 500 begins at step 502 and continues to step 504. At 504, a pair of signal traces is routed on substantially parallel conductive paths. The pair of signal traces can be routed using a dual track escape routing technique wherein the two traces are located in between a row or column of an array of contacts for a BGA package. The signal traces can be routed on the outermost layer of the PCB where the contacts are located. Alternatively, the signal traces can be routed on an inner layer in between an array of vias that are electrically coupled to the contacts. In some embodiments, the two signal traces correspond to a differential signal pair.

After the signal traces are routed, step 506 identifies a violation of a routing restriction or a cross-talk concern. A violation of a routing restriction can include failing to adhere to the minimum drill to metal (D2M) distance or the minimum back-drill to metal (BD2M) distance set forth by the PCB manufacturer. The minimum D2M distance sets forth the minimum required distance between a trace and the perimeter of a via. The minimum BD2M distance sets forth the minimum required distance between a trace and the perimeter of the back-drill bit size.

Alternatively, a cross-talk concern may exist between a signal corresponding to one of the routed traces and a via corresponding to another high-speed signal in the design. The proximity of the signal trace to the via can cause electrical interference that can cause signal degradation and poor system performance.

At 508, the routing path of at least one of the signal traces is modified to address the violation of the routing restriction or the cross-talk concern. The routing path of the first trace can be modified by replacing a section of the first signal trace with three trace segments. The first trace segment can deviate the signal trace away from the via that is the source of the routing violation or of the cross-talk concern. The length of the first trace segment can be selected to optimize the design while maintaining the necessary trace spacing between the modified trace and the second signal trace. The first trace segment is followed by a second trace segment that is connected to the first trace segment and returns the first signal trace to its original orientation, parallel to the second signal trace. The second trace segment is connected to a third trace segment that is directed away from the second signal trace. The first, second, and third trace segment combine to form a trapezoidal shape that has the replaced portion of the first trace as its base. In some embodiments, the first segment and the third segment can have substantially similar lengths.

At 510, the width of at least one of the signal traces is modified to be smaller than the original width. This "necking-down" technique can be used to create additional space between the signal trace and via that is the source of the violation (D2M or BD2M) or the cross-talk concern. The width of the first, second, and third trace segments can be modified to be less than the width of the original trace. In some embodiments, the reduction in width can be between 5% and 30%. Also, if the pair of traces corresponds to a differential signal pair, then the width of the second trace can also be reduced to match the width of the first trace. Reducing the widths of the signal traces can also allow for reduced spacing between the two signal traces. Therefore, a combination of a reduced width along with the deviated routing path can be used to further optimize the routes. However, one that is skilled in the art will recognize that the two techniques are not bound to each other and can be used independently to optimize routing. Furthermore, the reduced widths of the trace segments do not each have to be equivalent.

After step 510, the method proceeds to step 512 to verify the new routing paths satisfy the design requirements. The distance between the signal traces and the vias is measured to ensure that the minimum D2M distance is kept. Also, the distance between the signal traces and the back-drilled vias is measured to ensure that the minimum BD2M distance is kept. Further, the distance between the signal traces and a via that corresponds to another high-speed signal can be used to model the cross-talk effect. If any of these requirements are not satisfied, the traces can be modified further by altering the lengths of the corresponding segments and also altering the widths of the traces to ensure compliance with both manufacturing and electrical requirements.

After step 512, the method proceeds to step 514 wherein it returns to previous processing, which includes repeating method 500.

Figure 6:
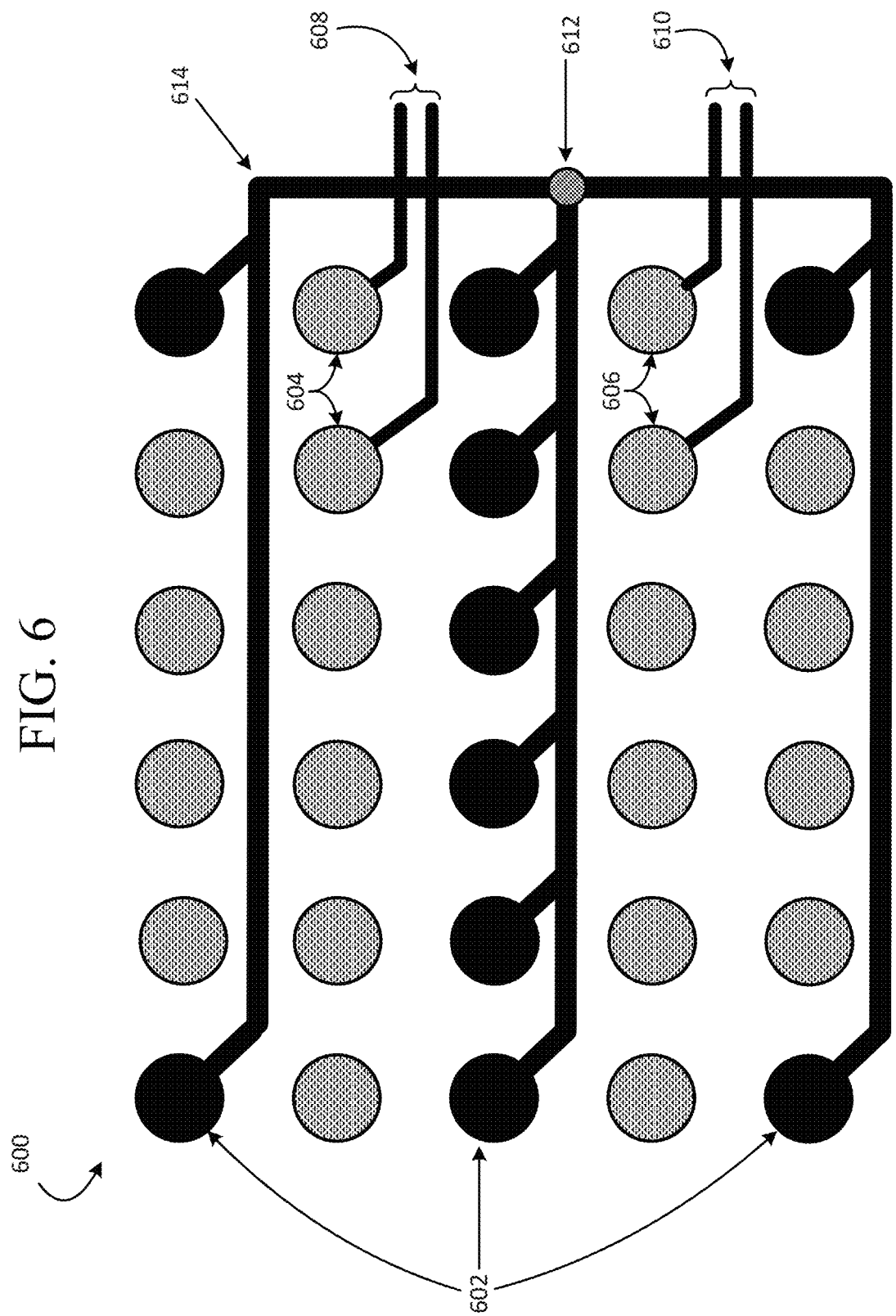
FIG. 6 illustrates an example system using disclosed routing techniques.

FIG. 6 illustrates an example system using the disclosed routing techniques. The system in FIG. 5 includes an array of contacts 600 suitable for receiving a component. Examples of such components can include an integrated circuit (IC) in a BGA package or a connector with contacts that are arranged as an array. The contacts can be located on a PCB or within a substrate of an IC. The contacts 600 include GROUND (GND) contacts 602 that are electrically coupled to each other with trace 614. The contacts 600 also include a first pair of signal contacts 604 that correspond to a first differential signal pair 608 and a second pair of signal contacts 606 that correspond to a second differential signal pair 610.

The first pair of signal contacts 604 and the second pair of signal contacts 606 are located along the outside of the array of contacts 600. Because the contacts are along the outside, they are not surrounded by GND contacts and the differential signal pairs 608 and 610 can be susceptible to additional cross-talk from other signals in the system.

Additional cross-talk protection can be achieved by adding a via 612 to the GND trace 614 and duplicating the GND trace on layers that are above and below differential signal pairs 608 and 610. For example, if differential signal pairs 608 and 610 are routed on the layer beneath the surface (layer 2), then GND via 612 can be used to route the GND signal to the layer beneath (layer 3) and create a duplicate GND trace 614 above and below the differential signal pairs

608 and 610. This routing technique can be used independently or in conjunction with the trace modification described herein to provide optimal cross-talk protection. One that is skilled in the art will realize that the GND isolation described in FIG. 6 can be implemented on a PCB or substrate with any number of layers and that the signals may be routed on the same layer or on different layers, without affecting the scope of the present technology.

In some embodiments, the subject technology may be utilized in a computer network environment. A computer network is a geographically distributed collection of nodes interconnected by communication links and segments for transporting data between endpoints, such as personal computers and workstations. Many types of networks are available, with the types ranging from local area networks (LANs) and wide area networks (WANs) to overlay and software-defined networks, such as virtual extensible local area networks (VXLANs).

LANs typically connect nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. LANs and WANs can include layer 2 (L2) and/or layer 3 (L3) networks and devices.

The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol can refer to a set of rules defining how the nodes interact with each other. Computer networks may be further interconnected by an intermediate network node, such as a router, to extend the effective "size" of each network.

Overlay networks generally allow virtual networks to be created and layered over a physical network infrastructure. Overlay network protocols, such as Virtual Extensible LAN (VXLAN), Network Virtualization using Generic Routing Encapsulation (NVGRE), Network Virtualization Overlays (NVO3), and Stateless Transport Tunneling (STT), provide a traffic encapsulation scheme which allows network traffic to be carried across L2 and L3 networks over a logical tunnel. Such logical tunnels can be originated and terminated through virtual tunnel end points (VTEPs).

Moreover, overlay networks can include virtual segments, such as VXLAN segments in a VXLAN overlay network, which can include virtual L2 and/or L3 overlay networks over which VMs communicate. The virtual segments can be identified through a virtual network identifier (VNI), such as a VXLAN network identifier, which can specifically identify an associated virtual segment or domain.

Network virtualization allows hardware and software resources to be combined in a virtual network. For example, network virtualization can allow multiple numbers of VMs to be attached to the physical network via respective virtual LANs (VLANs). The VMs can be grouped according to their respective VLAN, and can communicate with other VMs as well as other devices on the internal or external network.

Network segments, such as physical or virtual segments; networks; devices; ports; physical or logical links; and/or traffic in general can be grouped into a bridge or flood domain. A bridge domain or flood domain can represent a broadcast domain, such as an L2 broadcast domain. A bridge domain or flood domain can include a single subnet, but can also include multiple subnets. Moreover, a bridge domain can be associated with a bridge domain interface on a network device, such as a switch. A bridge domain interface can be a logical interface which supports traffic between an L2 bridged network and an L3 routed network. In addition, a bridge domain interface can support internet protocol (IP) termination, VPN termination, address resolution handling, MAC addressing, etc. Both bridge domains and bridge domain interfaces can be identified by a same index or identifier.

Furthermore, endpoint groups (EPGs) can be used in a network for mapping applications to the network. In particular, EPGs can use a grouping of application endpoints in a network to apply connectivity and policy to the group of applications. EPGs can act as a container for buckets or collections of applications, or application components, and tiers for implementing forwarding and policy logic. EPGs also allow separation of network policy, security, and forwarding from addressing by instead using logical application boundaries.

Cloud computing can also be provided in one or more networks to provide computing services using shared resources. Cloud computing can generally include Internet-based computing in which computing resources are dynamically provisioned and allocated to client or user computers or other devices on-demand, from a collection of resources available via the network (e.g., "the cloud"). Cloud computing resources, for example, can include any type of resource, such as computing, storage, and network devices, virtual machines (VMs), etc. For instance, resources may include service devices (firewalls, deep packet inspectors, traffic monitors, load balancers, etc.), compute/processing devices (servers, CPU's, memory, brute force processing capability), storage devices (e.g., network attached storages, storage area network devices), etc. In addition, such resources may be used to support virtual networks, virtual machines (VM), databases, applications (Apps), etc.

Cloud computing resources may include a "private cloud," a "public cloud," and/or a "hybrid cloud." A "hybrid cloud" can be a cloud infrastructure composed of two or more clouds that inter-operate or federate through technology. In essence, a hybrid cloud is an interaction between private and public clouds where a private cloud joins a public cloud and utilizes public cloud resources in a secure and scalable manner. Cloud computing resources can also be provisioned via virtual networks in an overlay network, such as a VXLAN.

Figure 7:
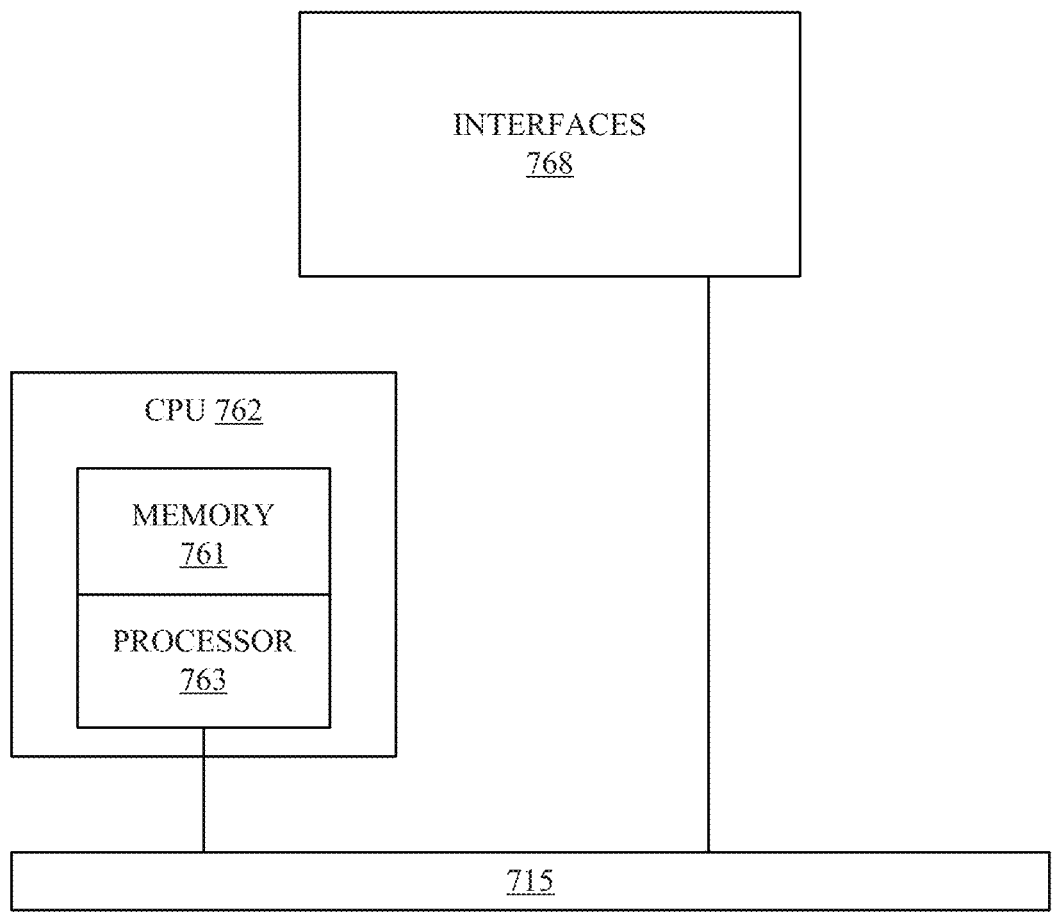
FIG. 7 illustrates an example network device according to some aspects of the subject technology.

FIG. 7 illustrates an exemplary network device 710 suitable for implementing the present invention. Network device 710 includes a master central processing unit (CPU) 762, interfaces 768, and a bus 715 (e.g., a PCI bus). When acting under the control of appropriate software or firmware, the CPU 762 is responsible for executing packet management, error detection, and/or routing functions, such as miscabling detection functions, for example. The CPU 762 preferably accomplishes all these functions under the control of software including an operating system and any appropriate applications software. CPU 762 may include one or more processors 763 such as a processor from the Motorola family of microprocessors or the MIPS family of microprocessors. In an alternative embodiment, processor 763 is specially designed hardware for controlling the operations of router 710. In a specific embodiment, a memory 761 (such as non-volatile RAM and/or ROM) also forms part of CPU 762. However, there are many different ways in which memory could be coupled to the system.

The interfaces 768 are typically provided as interface cards (sometimes referred to as "line cards"). Generally, they control the sending and receiving of data packets over the network and sometimes support other peripherals used with the router 710. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 762 to efficiently perform routing computations, network diagnostics, security functions, etc.

Although the system shown in FIG. 7 is one specific network device of the present invention, it is by no means the only network device architecture on which the present invention can be implemented. For example, an architecture having a single processor that handles communications as well as routing computations, etc. is often used. Further, other types of interfaces and media could also be used with the router.

Regardless of the network device's configuration, it may employ one or more memories or memory modules (including memory 761) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc.

Figure 8A:
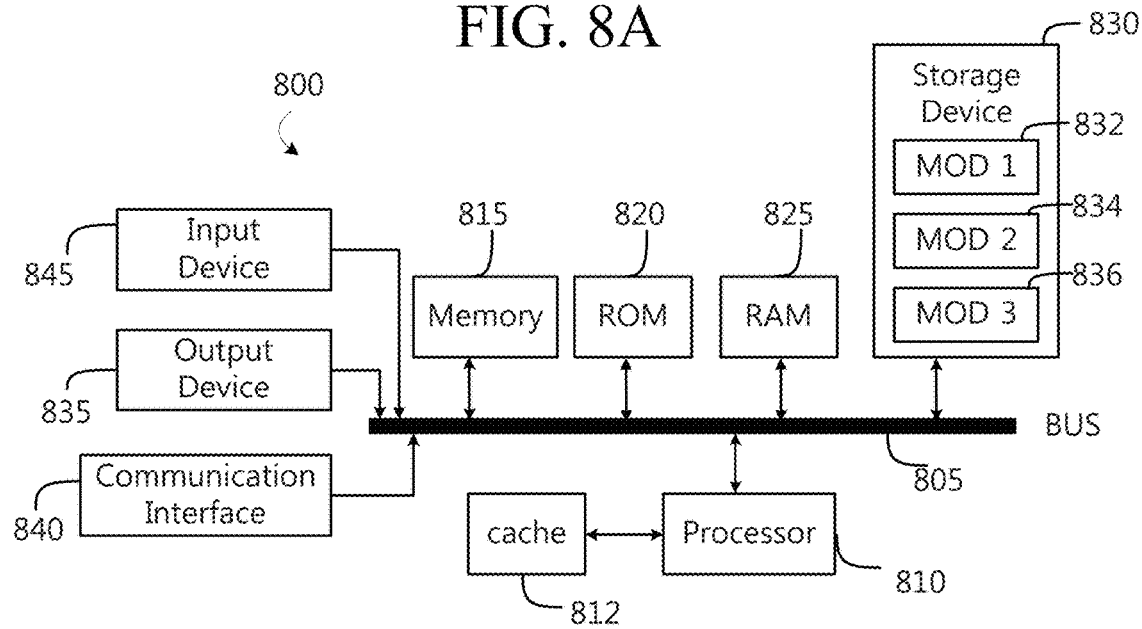
FIGS. 8A and 8B illustrate example system embodiments according to some aspects of the subject technology.
Figure 8B:
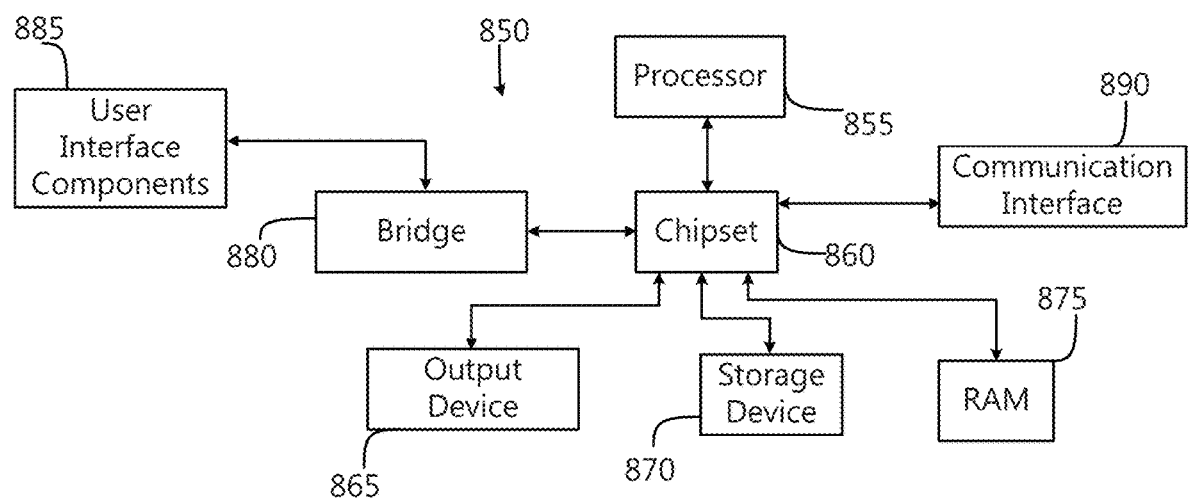

FIG. 8A, and FIG. 8B illustrate exemplary possible system embodiments. The more appropriate embodiment will be apparent to those of ordinary skill in the art when practicing the present technology. Persons of ordinary skill in the art will also readily appreciate that other system embodiments are possible.

FIG. 8A illustrates a conventional system bus computing system architecture 800 wherein the components of the system are in electrical communication with each other using a bus 805. Exemplary system 800 includes a processing unit (CPU or processor) 810 and a system bus 805 that couples various system components including the system memory 815, such as read only memory (ROM) 820 and random access memory (RAM) 825, to the processor 810. The system 800 can include a cache of high-speed memory connected directly with, in close proximity to, or integrated as part of the processor 810. The system 800 can copy data from the memory 815 and/or the storage device 830 to the cache 812 for quick access by the processor 810. In this way, the cache can provide a performance boost that avoids processor 810 delays while waiting for data. These and other modules can control or be configured to control the processor 810 to perform various actions. Other system memory 815 may be available for use as well. The memory 815 can include multiple different types of memory with different performance characteristics. The processor 810 can include any general purpose processor and a hardware module or software module, such as module 1 832, module 2 834, and module 3 836 stored in storage device 830, configured to control the processor 810 as well as a special-purpose processor where software instructions are incorporated into the actual processor design. The processor 810 may essentially be a completely self-contained computing system, containing multiple cores or processors, a bus, memory controller, cache, etc. A multi-core processor may be symmetric or asymmetric.

To enable user interaction with the computing device 800, an input device 845 can represent any number of input mechanisms, such as a microphone for speech, a touch-sensitive screen for gesture or graphical input, keyboard, mouse, motion input, speech and so forth. An output device 835 can also be one or more of a number of output mechanisms known to those of skill in the art. In some instances, multimodal systems can enable a user to provide multiple types of input to communicate with the computing device 800. The communications interface 840 can generally govern and manage the user input and system output. There is no restriction on operating on any particular hardware arrangement and therefore the basic features here may easily be substituted for improved hardware or firmware arrangements as they are developed.

Storage device 830 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 825, read only memory (ROM) 820, and hybrids thereof.

The storage device 830 can include software modules 832, 834, 836 for controlling the processor 810. Other hardware or software modules are contemplated. The storage device 830 can be connected to the system bus 805. In one aspect, a hardware module that performs a particular function can include the software component stored in a computer-readable medium in connection with the necessary hardware components, such as the processor 810, bus 805, display 835, and so forth, to carry out the function.

FIG. 8B illustrates a computer system 850 having a chipset architecture that can be used in executing the described method and generating and displaying a graphical user interface (GUI). Computer system 850 is an example of computer hardware, software, and firmware that can be used to implement the disclosed technology. System 850 can include a processor 855, representative of any number of physically and/or logically distinct resources capable of executing software, firmware, and hardware configured to perform identified computations. Processor 855 can communicate with a chipset 860 that can control input to and output from processor 855. In this example, chipset 860 outputs information to output 865, such as a display, and can read and write information to storage device 870, which can include magnetic media, and solid state media, for example. Chipset 860 can also read data from and write data to RAM 875. A bridge 880 for interfacing with a variety of user interface components 885 can be provided for interfacing with chipset 860. Such user interface components 885 can include a keyboard, a microphone, touch detection and processing circuitry, a pointing device, such as a mouse, and so on. In general, inputs to system 850 can come from any of a variety of sources, machine generated and/or human generated.

Chipset 860 can also interface with one or more communication interfaces 890 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 855 analyzing data stored in storage 870 or 875. Further, the machine can receive inputs from a user via user interface components 885 and execute appropriate functions, such as browsing functions by interpreting these inputs using processor 855.

It can be appreciated that exemplary systems 800 and 850 can have more than one processor 810 or be part of a group or cluster of computing devices networked together to provide greater processing capability.

As one of ordinary skill in the art will readily recognize, the examples and technologies provided above are simply for clarity and explanation purposes, and can include many additional concepts and variations.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Moreover, claim language reciting "at least one of" a set indicates that one member of the set or multiple members of the set satisfy the claim.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more."

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

The word "substantially" is used herein to mean "to a significant extent." Quantitatively, the word "substantially" means greater than or equal to 80%.

What is claimed is:

1. A method for routing signal traces comprising:
routing a first signal trace and a second signal trace on substantially parallel conductive paths;
determining the first signal trace violates a routing restriction with a first distance requirement from a drilling location on a printed circuit board and a second distance requirement based on a back-drill bit size associated with the drilling location, wherein the first distance requirement is a minimum distance from the first signal trace to a perimeter of a via at the drilling location and the second distance requirement is a minimum distance from the first signal trace to a perimeter of the back-drill bit size of a drill bit for creating the via;
modifying the first signal trace so it satisfies the routing restriction by replacing one or more sections of the first signal trace with at least one serpentine structure, the at least one serpentine structure including:
a first trace segment directed towards the second signal trace and away from the drilling location, a second trace segment connected to the first trace segment, the second trace segment being substantially parallel to the second signal trace and extending past the drilling location, and a third trace segment connected to the second trace segment, the third trace segment directed away from the second signal trace.

2. The method of claim 1, wherein the first signal trace is associated with a signal trace width.

3. The method of claim 2, wherein the modifying includes reducing a width dimension of at least one of the first trace segment, the second trace segment, or the third trace segment so the width dimension is less than the signal trace width.

4. The method of claim 1, wherein the substantially parallel conductive paths are located in between two adjacent strings of contacts on an outer layer of the printed circuit board.

5. The method of claim 4, wherein the two adjacent strings of contacts on the printed circuit board are part of an array of contacts corresponding to an integrated circuit having a ball grid array (BGA) package.

6. The method of claim 1, wherein the first signal trace and the second signal trace are used for conducting a differential signal pair.

7. The method of claim 1, wherein a first angle exists between the first trace segment and a line corresponding to the replaced one or more sections and a second angle exists between the third trace segment and the line corresponding to the replaced one or more sections.

8. The method of claim 7, wherein the first angle and the second angle are substantially equivalent.

9. The method of claim 8, wherein the first trace segment and the third trace segment are substantially equivalent in length.

10. The method of claim 1, wherein the substantially parallel conductive paths are located along a string of contacts extending along the printed circuit board.

11. The method of claim 10, wherein the substantially parallel conductive paths extend substantially parallel to the string of contacts.

12. The method of claim 10, wherein the first signal trace and the second signal trace extend substantially parallel in a first direction along the printed circuit board and away from the string of contacts before sending in a second direction along the printed circuit board and substantially parallel to the string of contacts.

13. The method of claim 12, wherein first signal trace extends further in the first direction than the second signal trace.

14. The method of claim 2, wherein the modifying includes reducing a width dimension of at least the first trace segment so the width dimension is less than the signal trace width.

15. The method of claim 2, wherein the modifying includes reducing a width dimension of only the first trace segment so the width dimension is less than the signal trace width.

16. The method of claim 2, wherein the modifying includes reducing a width dimension of only the second trace segment so the width dimension is less than the signal trace width.

17. The method of claim 2, wherein the modifying includes reducing a width dimension of only the third trace segment so the width dimension is less than the signal trace width.

18. The method of claim 2, wherein the modifying includes reducing a width dimension of the first trace segment, the second trace segment, and the third trace segment so the width dimension is less than the signal trace width.

* * * * *